(12) United States Patent
Patel

(10) Patent No.: US 9,819,445 B1
(45) Date of Patent: Nov. 14, 2017

(54) METHOD AND APPARATUS FOR JOINT RATE MATCHING AND DEINTERLEAVING

(71) Applicant: MBIT WIRELESS, INC., Irvine, CA (US)

(72) Inventor: Bhaskar Patel, San Clemente, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 14 days.

(21) Appl. No.: 15/147,556

(22) Filed: May 5, 2016

(51) Int. Cl.
  *H03M 13/03* (2006.01)
  *H04L 1/00* (2006.01)
(52) U.S. Cl.
  CPC .......... *H04L 1/0041* (2013.01); *H04L 1/0045* (2013.01); *H04L 1/0067* (2013.01); *H04L 1/0071* (2013.01)
(58) Field of Classification Search
  None
  See application file for complete search history.

(56) References Cited

U.S. PATENT DOCUMENTS

| | | | | |
|---|---|---|---|---|
| 5,583,500 A * | 12/1996 | Allen | ................... | H03M 7/4006 341/107 |
| 6,854,082 B1 * | 2/2005 | Rhee | ..................... | H03M 13/35 714/755 |
| 2008/0301536 A1 * | 12/2008 | Shin | ...................... | H04L 1/0043 714/786 |
| 2008/0320353 A1 * | 12/2008 | Blankenship | ......... | H04L 1/0068 714/746 |
| 2009/0300461 A1 * | 12/2009 | Shor | .................. | H03M 13/1114 714/752 |

OTHER PUBLICATIONS

3GPP TS 36.212 V12.8.0 (Mar. 2016), Technical Specification, 3rd Generation Partnership Project; Technical Specification Group Radio Access Network; Evolved Universal Terrestrial Radio Access (E-UTRA); Multiplexing and channel coding (Release 12), 2016, 11 pages.

* cited by examiner

*Primary Examiner* — M. Mujtaba Chaudry
(74) *Attorney, Agent, or Firm* — Lerner, David, Littenberg, Krumholz & Mentlik, LLP

(57) ABSTRACT

Digital communications systems employ Forward Error Correction (FEC) for robustness against fading, noise and interference. FEC is designed to support different code rates to meet different requirements. Different code rates may be achieved by performing puncturing or repetition operation. At the receiver the decoding may be performed on the baseline code rate to enable common decoder module. To enable this capability, the input to the decoder of the error correcting code must be initialized to zeros for the bit positions corresponding to bits that are not transmitted. For high throughput systems, it is not efficient to initialize particular bit positions to zero. A method and apparatus are disclosed for joint Rate Matching and deinterleaving that enable the decoder to begin the decoding operation on the received bits without explicitly initializing the punctured bit positions to zero.

20 Claims, 11 Drawing Sheets

Bitmap-0

Bitmap-1

METHOD AND APPARATUS FOR JOINT RATE MATCHING AND DEINTERLEAVING

BACKGROUND

Modern communications systems employ error correcting codes for robustness against fading, noise and interference. The error correcting codes are generally designed to support different code rates to meet different requirements of a variety of payload sizes and propagation channel conditions. For example, under poor channel conditions a lower code rate may be used with a large number of redundant bits in the coded output and under better channel conditions a higher code rate may be used with fewer redundant bits in the coded output.

Error correcting techniques can be grouped into two broad categories: Forward Error Correction (FEC) and Automatic Repeat Request (ARQ). Both methods may also use Cyclic Redundancy Check (CRC) for error detection. In case of FEC, redundant bits are added such that the receiver may be able to detect and possibly correct errors based on the received data. In case of ARQ, the receiver may be able to detect and possibly correct the errors. In case of ARQ, if the CRC fails even after possible error correction, a retransmission may be requested from the receiver to the transmitter. In case of retransmission, the transmitting side may send a different version of the encoded output for the same input block of data. The different encoded versions of the same input block of data may be identified by a Redundancy Version (RV). In both the FEC and ARQ methods, error correction is possible. The term FEC is used herein to refer to any error correcting code being used in a communication system.

Often the baseline error correcting code may be the same and the different code rates may be achieved by performing puncturing or repetition operation on the encoded bits. Sometimes the baseline code is known as the "Mother Code" since other code rates may be derived from this code rate. The puncturing and/or repetition operations are often collectively referred to as "Rate Matching" function. For example, as shown in FIG. 1, for each input bit, the FEC Mother Code Encoder 103 may output three bits with the baseline code rate of 1/3. The actual code rate for a transmitted block of bits may be different. For example, by puncturing some of the bits from the encoded output, higher code rates 2/3, 3/4, 5/6, etc. may be achieved. The bits that are generated by the Mother Code but are removed by the Rate Matching function are referred as punctured bits. Note that the Rate Matching can perform repetition or puncturing. In case of repetition, some or all of the encoded bits may be repeated to achieve lower code rates such as 1/4, 1/5, 2/7, etc.

In some propagation channels the bit errors may occur in bursts. For example, in case of mobile wireless communication, fading may cause loss of a burst of data. Many of the commonly used error correcting codes perform well when operating on received bits with errors in random positions. In order to improve the performance of the error correcting codes in the presence of burst errors, interleavers are often used to randomize the burst errors. FIG. 1 shows the use of interleavers 104, 106, and 108 in the encoding process. The interleaving function may be performed over the entire set of output bits or it may be performed individually on the different groups of output bits as illustrated in FIG. 1. In this case the interleavers 104, 106, and 108 may be referred to as Sub-block interleavers. The output of the interleavers is provided to the Rate Matching unit 110 which performs the puncturing or repetition function.

At the receiver the decoding may be performed using the received channel bits often referred to as soft bits or Log Likelihood Ratios (LLRs) which indicate whether a bit is 1 or 0 with additional information about its reliability. To enable a common decoder unit, regardless of the actual code rate used for transmission, a decoder may be designed for the Mother Code rate as shown in FIG. 2. To enable this capability, the demodulated soft bits, i.e., LLRs, are input to the Rate Matching unit 202 in FIG. 2. The Rate Matching unit at the receiver performs the reverse operation of the Rate Matching unit at the transmitter. In case of puncturing, the Rate Matching unit 202 may need to insert zeros for the bit positions for which there are no received LLRs from the transmitter side. The Rate Matching may initialize the input buffer for the FEC decoder to zeros for the bit positions corresponding to bits that are not transmitted by the sender of the data.

The initialization of the LLR input buffer for the FEC decoder to zero for bit positions for which there is no transmission from the sender may be complicated by the presence of Deinterleavers 204, 206 and 208 that may be used in many digital communication systems. The bit positions that are punctured may not be contiguous or easily separable after deinterleaving. The deinterleaving operation is the reverse of the interleaving operation. The deinterleaving function may be performed individually on the different group of bits output as illustrated in FIG. 2 if Sub-block interleaving is used at the transmitter side. In this case the deinterleavers 204, 206, and 208 may be referred to as Sub-block deinterleavers.

For a high throughput system, it may not be efficient to initialize the LLRs for punctured bit positions to zero before starting the FEC decoding operation.

SUMMARY

A method and apparatus are disclosed that perform joint Rate Matching and deinterleaving and enable an FEC decoder to begin the decoding operation on the received LLRs without explicitly initializing the LLRs for the punctured bit positions to zero. This in turn enables higher throughput FEC decoder with reduced power consumption.

In accordance with an aspect of the present disclosure, a method may decode coded bits of a signal received at a communication device in a communication system, wherein the coded bits are generated based on encoding a block of input bits into a plurality of streams of bits, interleaving the plurality of streams of bits into interleaved first bits and interleaved and interlaced second bits, storing the interleaved first bits and the interleaved and interlaced second bits in an encoder buffer, and outputting the interleaved first bits and the interleaved and interlaced second bits from the encoder buffer as the coded bits by removing at least one bit forming each stream of the plurality of streams of bits according to a predetermined code rate matching process. The method may include controlling, by a processing device, decoding the coded bits, wherein the decoding includes: storing the coded bits in a plurality of sets of interleaved bits in a receive buffer; deinterleaving the interleaved bits in the receive buffer by determining, for each bit position corresponding to a given bit of the interleaved bits in the receive buffer, whether a Log Likelihood Ratio (LLR) corresponding to the bit position is valid or the bit position corresponds to a removed bit, based on resource allocation control information describing generation of the coded bits, wherein the control information indicates whether the bit position in the receive buffer corresponds to a valid bit or a removed bit; when the LLR corresponding to the bit position is determined to be valid, supplying the LLR for the given bit corresponding to the bit position as a given deinterleaved bit; and when the bit position corresponds to a removed bit, supplying a value of zero which is automatically generated as the given deinterleaved bit for the given bit corresponding to the bit position; and performing error correction on the given deinterleaved bits.

In one alternative, the method may include controlling, by the processing device, initializing an initial value of a counter to zero and a maximum value of the counter to a size of the block of input bits, based on the control information; and for each counter value from zero to the maximum value, storing in a decoding buffer the LRR for the given bit or the value of zero using the counter value as a write address for the decoding buffer, wherein the LRR for the given bit is read from the receive buffer using the counter value as a read address when the LLR corresponding to the bit position for the given bit is determined to be valid, and wherein the counter value is incremented after each storing in the decoding buffer for a given counter value.

In one alternative, the method may include controlling, by the processing device, a multiplexer to route, to the decoding buffer for the bit position corresponding to the given bit, the LLR for the given bit from the input LLR buffer or the value of zero.

In one alternative, the control information may include at least one of Modulation and Coding Scheme (MCS), Redundancy Version or code rate associated with the generating of the coded bits.

In one alternative, the communication system may be a wireless communication system.

In one alternative, the determining whether the LLR corresponding to the bit position is valid or the bit position corresponds to a removed bit may be based on a bit map generated from the control information.

In one alternative, the method may include controlling, by the processing device, storing the given deinterleaved bits at respective bit positions in a decoding buffer determined using the bit map.

In accordance with an aspect of the present disclosure, a method may decode coded bits of a signal received at a communication device in a communication system, wherein the coded bits are generated based on encoding a block of input bits into first, second and third streams of bits, in which the first stream of bits includes systematic bits and the second and third streams of bits include respective second and third parity bits, interleaving the first stream of bits into interleaved first bits and the second and third streams of bits into interleaved and interlaced second bits, storing the interleaved first bits and the interleaved and interlaced second bits in an encoder buffer, and outputting the interleaved first bits and the interleaved and interlaced second bits from the encoder buffer as the coded bits by removing at least one bit forming each stream of the first, second and third streams of bits according to a predetermined code rate matching process. The method may include controlling, by a processing device, decoding the coded bits, wherein the decoding includes: storing the interleaved first bits of the coded bits in a first receive buffer, and the interleaved and interlaced second bits in second and third receive buffers, wherein the first, second and third receive buffers form an input Log Likelihood Ratio (LLR) buffer; generating a first bitmap indicating positions corresponding bits of the first stream of bits in the first receive buffer, a second bit map indicating positions of bits of each of the second and third streams of bits in the second and third receive buffers, and index information of a first unfilled row in the encoder buffer, based on resource allocation control information describing generation of the coded bits, wherein the control information indicates whether a given bit position in the input LLR buffer corresponds to a valid bit or a removed bit, in which each of the first and second bitmaps indicates, for a given bit position within the bitmap, whether a corresponding column in the encoder buffer is completely or partially filled; determining, using at least one of the first bitmap, the second bitmap or the index information of the first unfilled row in the encoder buffer, for each bit position corresponding to a given bit in the input LLR buffer, whether a LLR corresponding to the bit position is valid or the bit position corresponds to a removed bit, when the LLR corresponding to the bit position is determined to be valid, storing the LLR for the given bit as a given deinterleaved bit at a corresponding bit position in a decoding buffer; and when the bit position corresponds to a removed bit, storing a value of zero which is automatically generated as the given deinterleaved bit at the corresponding bit position in the decoding buffer; and performing error correction on the given deinterleaved bits in the decoding buffer. In one alternative, each of the first and second bit maps may use a same predetermined number of bits and a number of columns in the encoder buffer may be equal to three times the predetermined number of bits.

In accordance with an aspect of the present disclosure, an apparatus may decode coded bits of a signal received at a communication device in a communication system, wherein the coded bits are generated based on encoding a block of input bits into a plurality of streams of bits, interleaving the plurality of streams of bits into interleaved first bits and interleaved and interlaced second bits, storing the interleaved first bits and the interleaved and interlaced second bits in an encoder buffer, and outputting the interleaved first bits and the interleaved and interlaced second bits from the encoder buffer as the coded bits by removing at least one bit forming each stream of the plurality of streams of bits according to a predetermined code rate matching process. The apparatus may include circuitry configured to control decoding the coded bits, wherein the decoding includes: storing the coded bits in a plurality of sets of interleaved bits in a receive buffer; deinterleaving the interleaved bits in the receive buffer by determining, for each bit position corresponding to a given bit of the interleaved bits in the receive buffer, whether a Log Likelihood Ratio (LLR) corresponding to the bit position is valid or the bit position corresponds to a removed bit, based on resource allocation control information describing generation of the coded bits, wherein the control information indicates whether the bit position in the receive buffer corresponds to a valid bit or a removed bit; when the LLR corresponding to the bit position is determined to be valid, supplying the LLR for the given bit corresponding to the bit position as a given deinterleaved bit; and when the bit position corresponds to a removed bit, supplying a value of zero which is automatically generated as the given deinterleaved bit for the given bit corresponding to the bit position; and performing error correction on the given deinterleaved bits.

In one alternative of the apparatus, the circuitry may be configured to control: initializing an initial value of a counter to zero and a maximum value of the counter to a size of the block of input bits, based on the control information, for each counter value from zero to the maximum value, storing in a decoding buffer the LRR for the given bit or the value of zero using the counter value as a write address for the decoding buffer, wherein the LRR for the given bit is read from the receive buffer using the counter value as a read address when the LLR corresponding to the bit position for the given bit is determined to be valid, and wherein the counter value is incremented after each storing in the decoding buffer for a given counter value.

In one alternative of the apparatus, the circuitry may be configured to control a multiplexer to route, to the decoding buffer for the bit position corresponding to the given bit, the LLR for the given bit from the input LLR buffer or the value of zero.

In one alternative of the apparatus, the control information may include at least one of Modulation and Coding Scheme (MCS), Redundancy Version or code rate associated with the generating of the coded bits.

In one alternative of the apparatus, the communication system may be a wireless communication system.

In one alternative of the apparatus, the determining whether the LLR corresponding to the bit position is valid or the bit position corresponds to a removed bit may be based on a bit map generated from the control information.

In one alternative of the apparatus, the circuitry may be configured to control storing the given deinterleaved bits at respective bit positions in a decoding buffer determined using the bit map.

In accordance with an aspect of the present disclosure, a wireless communication device may include a receiver to receive a signal of a wireless communication system; and a processing device configured to control decoding coded bits of the signal, wherein the coded bits are generated based on encoding a block of input bits into a plurality of streams of bits, interleaving the plurality of streams of bits into interleaved first bits and interleaved and interlaced second bits, storing the interleaved first bits and the interleaved and interlaced second bits in an encoder buffer, and outputting the interleaved first bits and the interleaved and interlaced second bits from the encoder buffer as the coded bits by removing at least one bit forming each stream of the plurality of streams of bits according to a predetermined code rate matching process. The processing device may be configured to control decoding the coded bits, wherein the decoding includes: storing the coded bits in a plurality of sets of interleaved bits in a receive buffer; deinterleaving the interleaved bits in the receive buffer by determining, for each bit position corresponding to a given bit of the interleaved bits in the receive buffer, whether a Log Likelihood Ratio (LLR) corresponding to the bit position is valid or the bit position corresponds to a removed bit, based on resource allocation control information describing generation of the coded bits, wherein the control information indicates whether the bit position in the receive buffer corresponds to a valid bit or a removed bit; when the LLR corresponding to the bit position is determined to be valid, supplying the LLR for the given bit corresponding to the bit position as a given deinterleaved bit; and when the bit position corresponds to a removed bit, supplying a value of zero which is automatically generated as the given deinterleaved bit for the given bit corresponding to the bit position; and performing error correction on the given deinterleaved bits.

In one alternative of the wireless communication device, the processing device may be configured to control: initializing an initial value of a counter to zero and a maximum value of the counter to a size of the block of input bits, based on the control information; and for each counter value from zero to the maximum value, storing in a decoding buffer the LRR for the given bit or the value of zero using the counter value as a write address for the decoding buffer, wherein the LRR for the given bit is read from the receive buffer using the counter value as a read address when the LLR corresponding to the bit position for the given bit is determined to be valid, and wherein the counter value is incremented after each storing in the decoding buffer for a given counter value.

In one alternative of the wireless communication device, the processing device may be configured to control a multiplexer to route, to the decoding buffer for the bit position corresponding to the given bit, the LLR for the given bit from the input LLR buffer or the value of zero.

In one alternative of the wireless communication device, the determining whether the LLR corresponding to the bit position is valid or the bit position corresponds to a removed bit may be based on a bit map generated from the control information.

DETAILED DESCRIPTION

Figure 1:
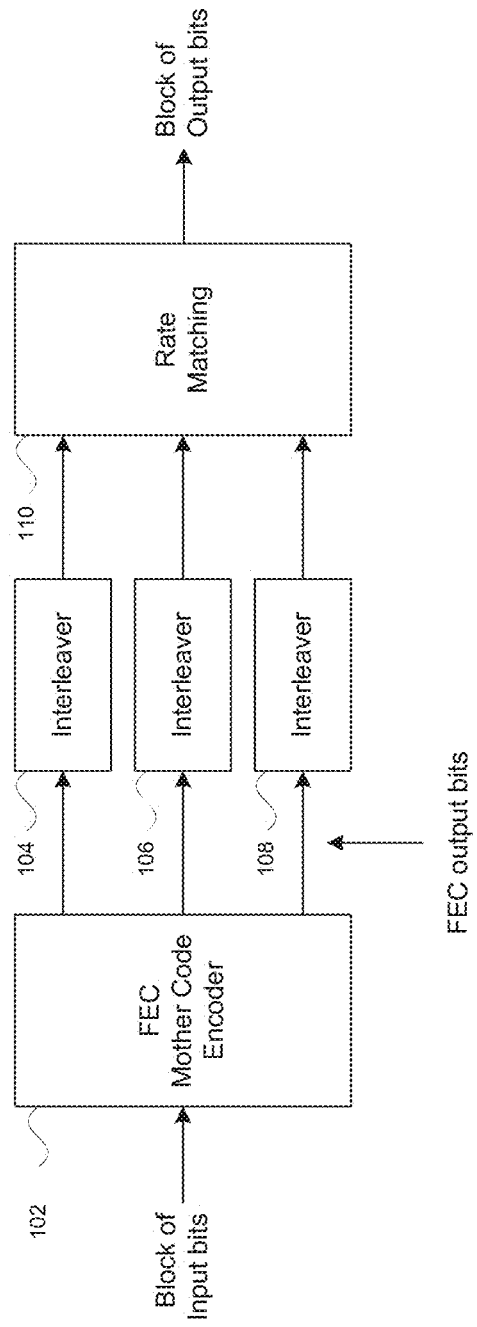
FIG. 1 illustrates an example Forward Error Correction (FEC) encoding, interleaving and Rate Matching block diagram for a transmitter.
Figure 2:
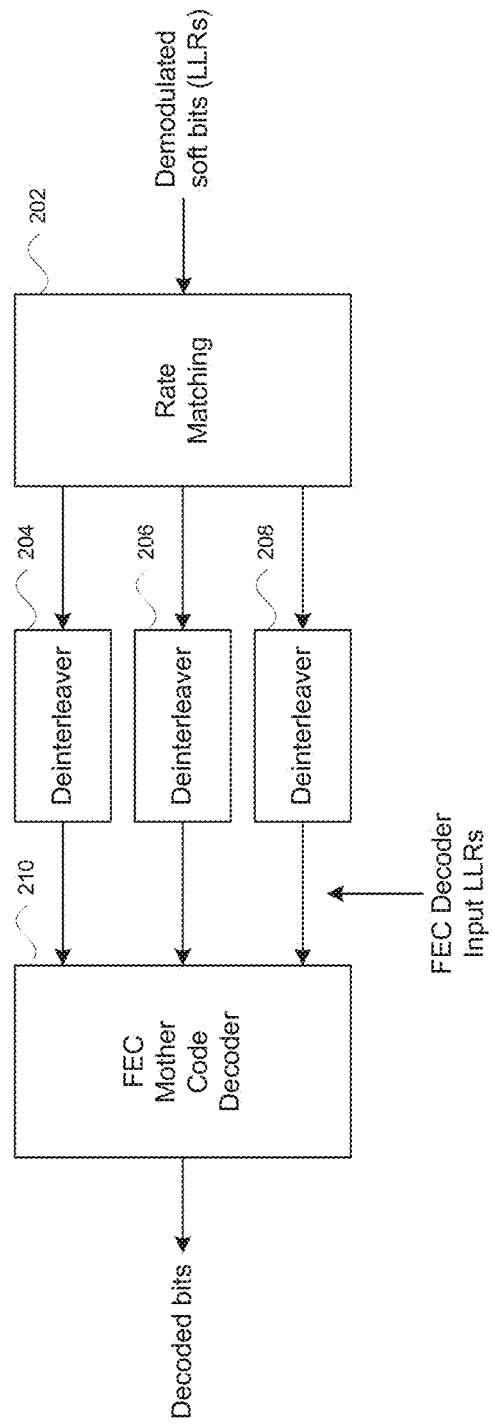
FIG. 2 illustrates an example Rate Matching, deinterleaving and FEC decoding block diagram for a receiver.

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the aspects of the disclosure are not intended to be limited to the specific terms used.

According to an aspect of the present disclosure, the deinterleaver at the receiver may keep track of the actual valid received bits and the punctured bits. According to another aspect of the present disclosure, whenever the FEC decoder requests LLR bits for processing, the deinterleaver dynamically determines whether a valid LLR is received for that bit position. If a valid LLR is received for that bit position, then the deinterleaver provides it to the decoder. According to an aspect of the present disclosure, if the LLR for the bit position requested by the FEC decoder is one of the punctured bits, then the deinterleaver may automatically locally generate a value of zero and provide it to the decoder. This enables the decoder to work with the "Mother Code" regardless of the actual code rate used during transmission and without explicitly spending clock cycles to initialize the receiver buffer to ensure that the LLRs for the punctured bit positions are filled with zeros.

Figure 3:
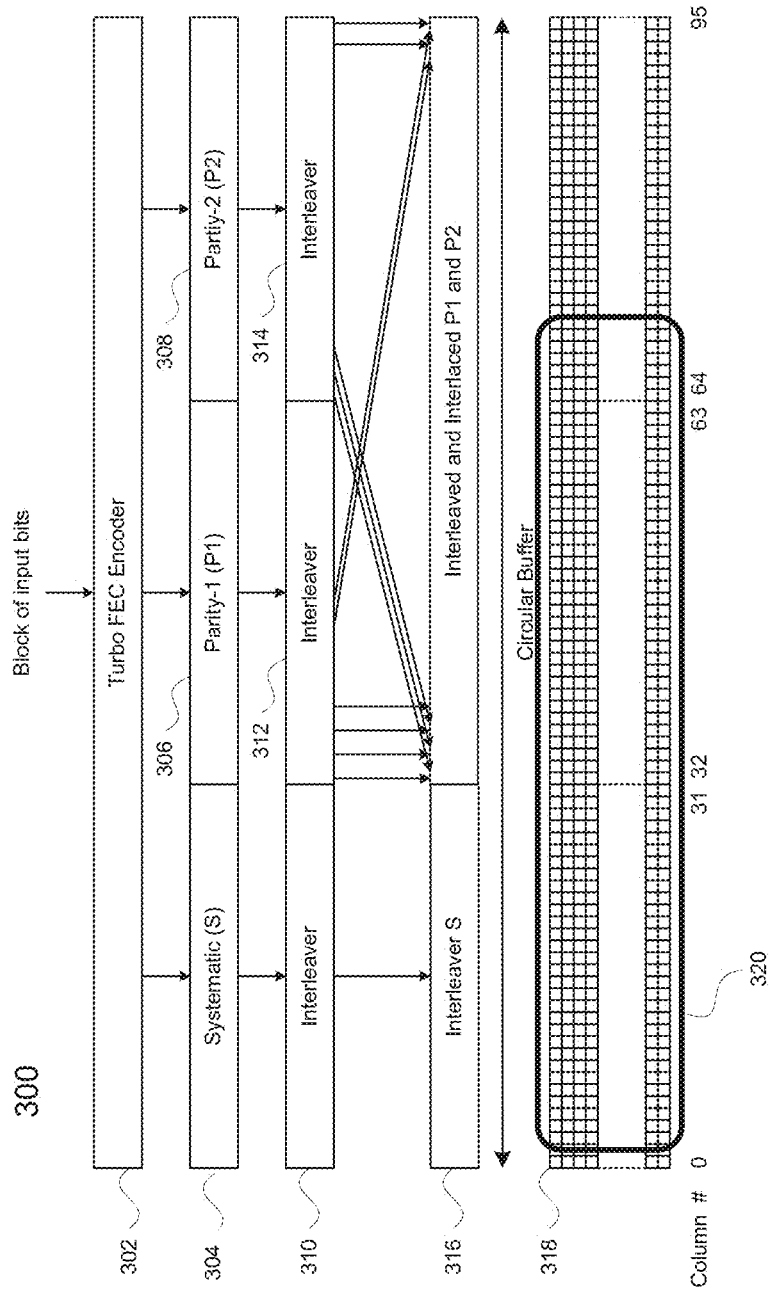
FIG. 3 illustrates an example Turbo FEC encoding, interleaving and Rate Matching block diagram for $3^{rd}$ Generation Partnership Project (3GPP) Long Term Evolution (LTE) wireless communication system.

The method is illustrated for the $3^{rd}$ Generation Partnership Project (3GPP) Long Term Evolution (LTE) wireless communication system. The 3GPP LTE FEC encoding, interleaving and Rate Matching functions are illustrated in FIG. 3. The Turbo FEC Encoder 302 outputs three streams of bits called Systematic (S) bits 304, Parity-1 (P1) bits 306, and Parity-2 (P2) bits 308. The Sub-block interleaving function in 3GPP LTE wireless communication system is based on the traditional row-column interleaver with 32 columns (for all input block sizes) and a length-32 intra-column permutation. The bits of each stream (S, P1 and P2) are written row-by-row into a matrix with 32 columns (the number of rows is determined by the stream size), with dummy bits padded to the front of each stream to completely fill the matrix. The 3GPP LTE wireless communication system Sub-block interleaver is fully described in the 3GPP LTE specification 36.212, V12.8.0, March 2016, pg. 8-11, incorporated by reference herein. A length-32 column permutation is applied and the bits are read out column-by-column to form the output of the Sub-block interleavers 310, 312, and 314. The interleaved Systematic bits and the interleaved and interlaced Parity-1 and Parity-2 bits are arranged in a single two-dimensional buffer 316 of total 3*32=96 columns. A two-dimensional illustration 318 of the circular buffer (with a total of 96 columns) is also shown in FIG. 3. The output may be formed by reading bits out column-by-column from the two-dimensional buffer. Bits are read column-by-column starting from top row of a column, and the dummy bits are discarded during the output bit generation. Although the dummy bits can be discarded during Sub-block interleaving, in a 3GPP LTE wireless communication system the dummy bits are kept to allow a simpler implementation. The number of columns read out for the output depends on the code rate being used. In FIG. 3, the set of columns used for Turbo FEC Encoder output and transmission is illustrated by 320. As can be observed from FIG. 3, the FEC output has bits punctured from each of the three streams S, P1 and P2.

Figure 4:
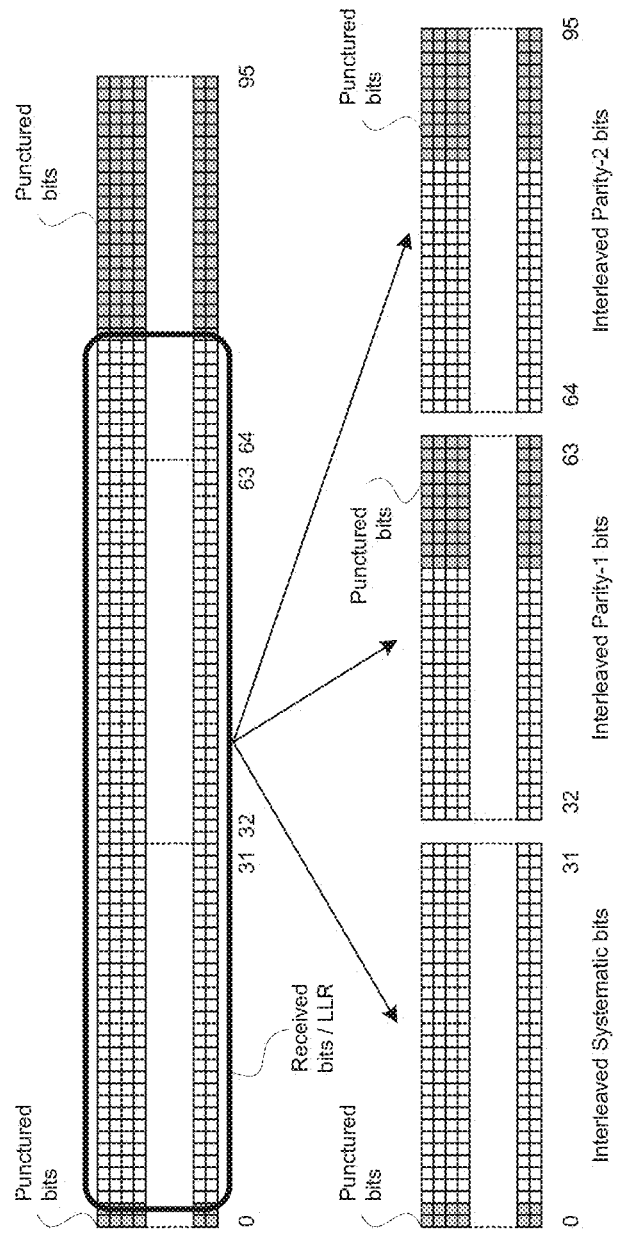
FIG. 4 illustrates a scenario for received LLRs and punctured bits at a receiver for 3GPP LTE wireless communication system.

At the receiver, the received LLRs may be arranged in three separate two-dimensional buffers as illustrated in FIG. 4. These buffers form the input for the three separate Sub-block deinterleavers, one for each stream. The deinterleaver reads the input buffer, deinterleaves the bits and writes them into Turbo FEC Mother Code Decoder input buffer. The subset of coded bits that are transmitted after Rate Matching may be determined by using the received resource allocation control information such as Modulation and Coding Scheme (MCS), Redundancy Version, input block size, code rate, number of coded output bits to be transmitted, etc. The control information may be provided by the transmitting side along with the payload data, possibly in a separately coded channel. If the code rate of the currently received block of data is such that the number of received LLRs is less than the amount of data that can be stored in the deinterleaver buffer, only a portion of the deinterleaver buffer may be filled.

Figure 5:
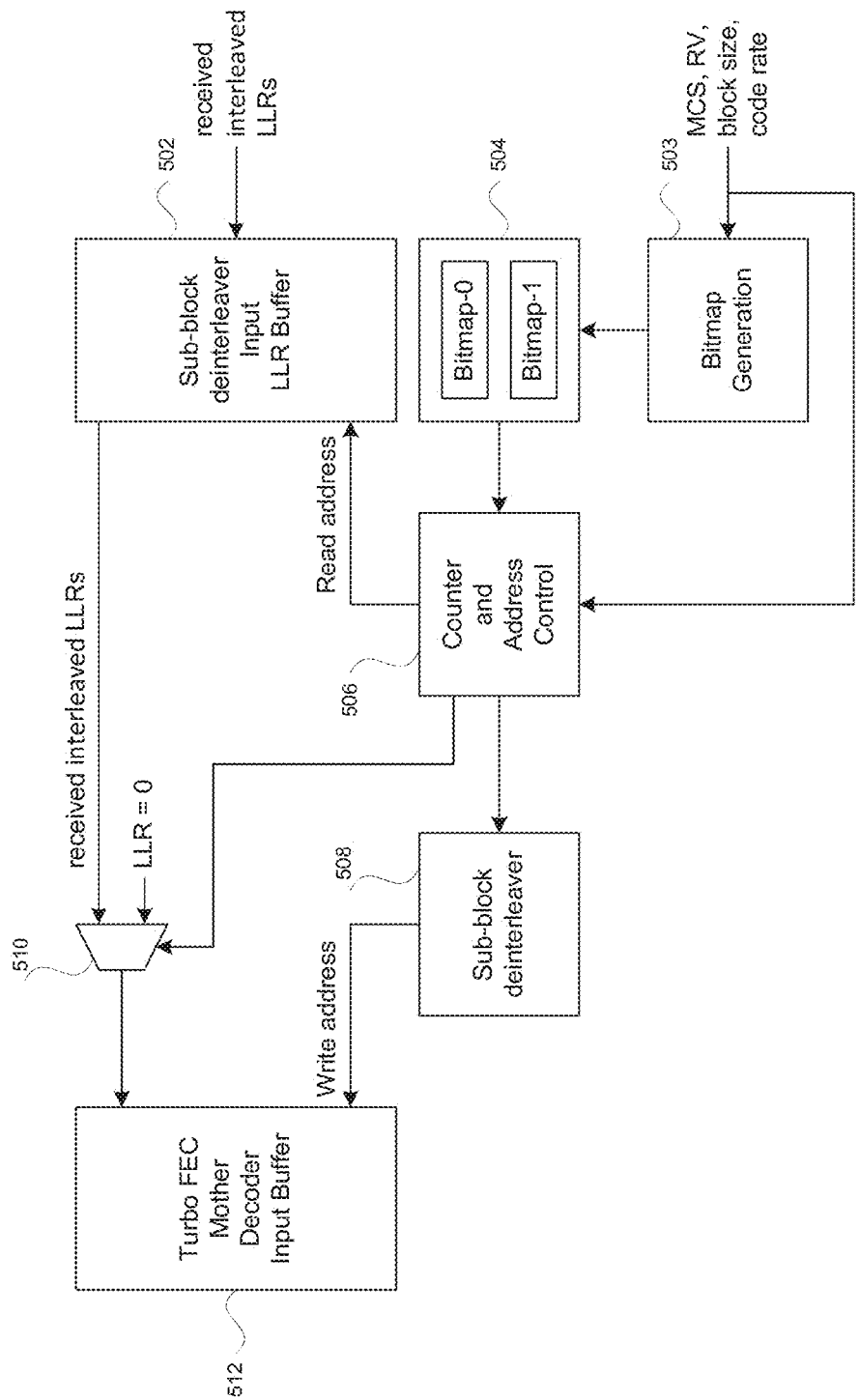
FIG. 5 illustrates an example block diagram for joint Rate Matching and deinterleaving to provide LLRs for punctured bits according to the aspects of the present disclosure.

The method of joint Rate Matching and deinterleaving according to the aspects of the present disclosure is illustrated in FIG. 5. The received interleaved LLRs for a stream are stored in the buffer 502. According to the aspects of the present disclosure, when all the bits for a stream are received, the joint Rate Matching and deinterleaving process may begin. The initial value of the counter in the Counter and Address Control block 506 may be initialized to zero and the maximum value of the counter may be initialized based on the block size. The Bitmap-0 and Bitmap-1 in block 504 and the index of the first unfilled row in the two-dimensional interleaver buffer may be initialized by the Bitmap Generation block 503 according to the received control information such as MCS, RV, block size, code rate, etc. The Bitmap-0 may correspond to the stream S and Bitmap-1 may correspond to streams P1 and P2 as the same information is applicable to both the streams. According to an aspect of the present disclosure, for the chosen 3GPP LTE wireless communication system, the joint Rate Matching and deinterleaving method uses two bitmaps of 32 bits each corresponding to 32 columns of the Sub-block interleaver. The bitmaps are used to indicate the last column and first unfilled row index to identify the locations of holes in the received LLR buffer. The status of the bitmap indicates the columns that are filled completely in the buffer. If the value of a particular bit position within the bitmap is '1', it indicates that the corresponding column in the two-dimensional arrangement of the buffer is completely filled. If the value of a particular bit position within the bitmap is '0', it indicates that the corresponding column in the two-dimensional arrangement of the buffer is partially filled. The last completely filled column number information from the bitmap along with the information about the index of the first unfilled row in the partially filled column is used to identify the holes, i.e., punctured bits.

Figure 6:
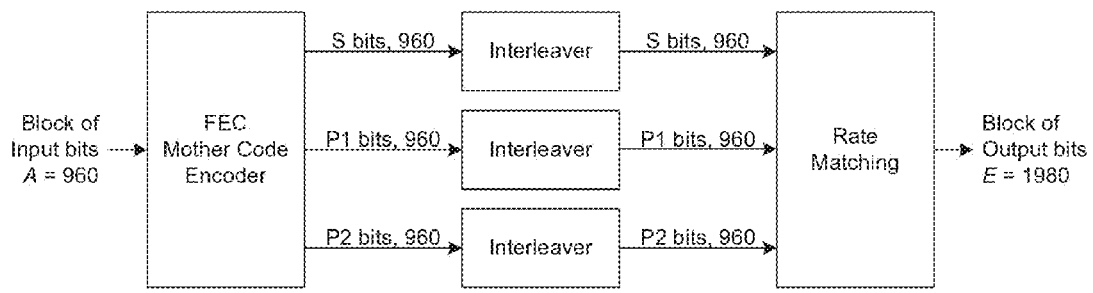
FIG. 6 illustrates an example Forward Error Correction (FEC) encoding, interleaving and Rate Matching block diagram for a transmitter for specific input block size and output block size.
Figure 7:
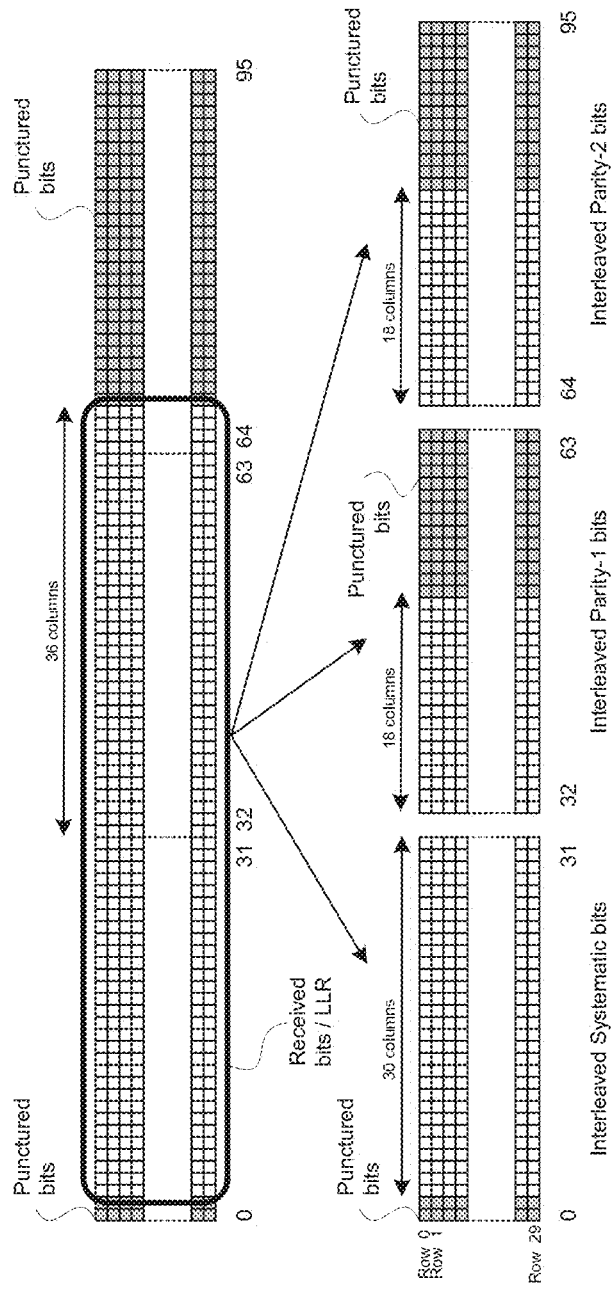
FIG. 7 illustrates a scenario for received LLRs and punctured bits at a receiver for a 3GPP LTE wireless communication system for specific input block size and output block size.
Figure 8A:
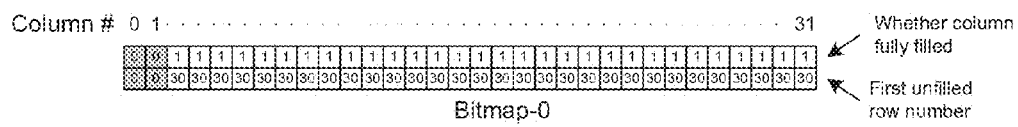
FIGS. 8A and 8B illustrate the Bitmap-0 and Bitmap-1 generated according to the aspects of the present disclosure for specific input block size and output block size.
Figure 8B:
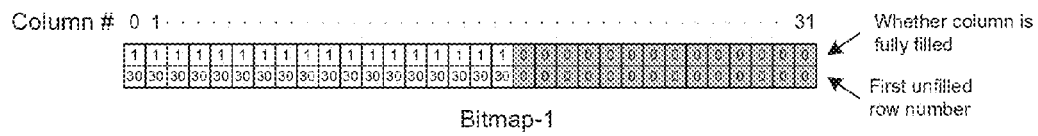
Figure 10:
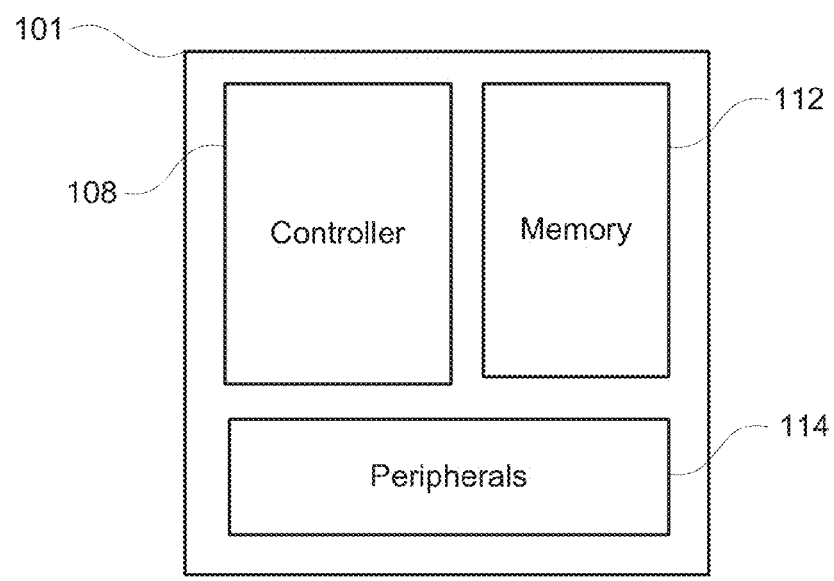
FIG. 10 illustrates an application processor subsystem for a wireless mobile station, which may be employed with aspects of the disclosure described herein.

An example of the bitmap generation process is described next. The received resource allocation control information may include, among other things, the following information:
  A: Number of input data bits to be encoded (input block size)
  E: Number of encoded bits to be transmitted after performing the encoding process on A bits and after performing the rate matching With this information, the processing for encoding and rate-matching operation may be performed according to the 3GPP LTE specifications and from that the bitmaps may be generated. For example, the received resource allocation control information may be such that A=960 bits and let E=1980 bits as shown in FIG. 6. In this case the code rate is A/E=960/1980=0.4848. The mother code rate of the Turbo FEC Encoder is 1/3, therefore the number of encoded bits after the encoding will be 3×A=3×960=2880 bits. Since only E=1980 bits can be transmitted, the 2880−1980=900 bits may be punctured from the encoded bits. An exemplary method to determine the specific bits that are punctured is as follows. The encoded 3×A=2880 bits may be arranged in 96 columns as illustrated in FIG. 7. Interleaving is done by filling the buffer row-wise and reading it out column wise (with possible permutation of columns). Rate matching is done by only using a subset of the columns when the code rate is higher than 1/3. For the current example, there will be 2880/96=30 full rows (all columns have the same number of bits). Since only E=1980 bits may be transmitted, a subset of columns is selected according to the 3GPP LTE specifications. The specific columns to be used are determined according to the Redundancy Version (RV) to be used. For RV=0, the first two columns are skipped as illustrated in FIG. 10. Next the remaining columns (32−2=30) of the Systematic (S) bits may be used. This means that 30 (columns)×30 (rows)=900 bits are accounted for from the Systematic (S) bits portion. The remaining 1980−900=1080 bits may be taken from the interlaced P1 and P2 bits. This means 1080/30 (rows)=36 full columns from the interlaced P1 and P2 bits may be used. Equivalently, 18 columns from the 32 columns of P1 bits and similarly, 18 columns from the 32 columns of P2 bits may be used. In this case the Bitmap-0 which corresponds to the Systematic (S) bits may be as shown in FIG. 8A. Similarly, the Bitmap-1 which corresponds to the P1 and P2 bits may be as shown in FIG. 8B. A similar process may be used for preparing the bitmaps based on the allocation information. The example illustrated in FIGS. 8A and 8B is for the case where all the columns are fully filled. Depending on the value of E, there may be at least one column that may be partially filled.

Referring again to FIG. 5, each value of the counter in the Counter and Address Control block 506 corresponds to a bit position for the LLRs in the Turbo Mother Code Decoder Input Buffer 512. For each value of the counter in the Counter and Address Control block 506, the Bitmap-0 and Bitmap-1 in block 504 are looked up to determine whether the present bit position corresponds to a received LLR or a hole. If the present bit position corresponds to a received LLR, then the select line for the multiplexer 510 is asserted by the Counter and Address Control block 506 such that the output from the Sub-block deinterleaver Input LLR Buffer 502 is selected. The counter value may be used as a read address for the Sub-block deinterleaver Input LLR Buffer 502. The Sub-block deinterleaver 508 generates the write address based on the counter value in the Counter and Address Control block 506 which also serves as the read address for the input buffer 502. The output from the Sub-block deinterleaver Input LLR Buffer 502 is routed through the multiplexer 510 into the Turbo Mother Code Decoder Input Buffer 512 with the write address generated by the Sub-block deinterleaver 508. Next the counter value in the Counter and Address Control block 506 is incremented to prepare the next input for the Turbo Mother Code Decoder Input Buffer 512. For the new value of the counter, the Bitmap-0 and Bitmap-1 in block 504 are looked up to determine whether the present bit position corresponds to a received LLR or a hole. If it corresponds to a hole, then the select line for the multiplexer 510 is asserted by the Counter and Address Control block 506 such that that LLR value of zero is selected. In this case, the new value of the counter value is not used as a read address for the Sub-block deinterleaver Input LLR Buffer 502. The Sub-block deinterleaver 508 generates the write address based on the new value of the counter in the Counter and Address Control block 506.

Figure 9:
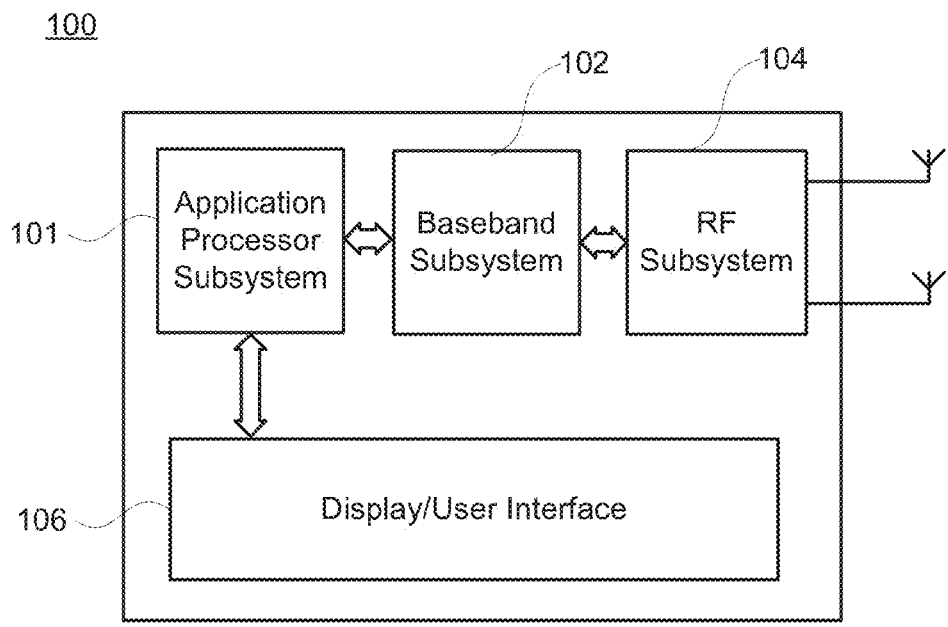
FIG. 9 illustrates a wireless mobile station diagram, which may be employed with aspects of the disclosure described herein.

By way of example only, the above described method may be implemented in a receiver, e.g., a user device such as a wireless mobile station (MS) 100 as shown in FIG. 9. The aspects of the present disclosure may be applied to various wireless communication systems such as systems based on an IEEE 802.16 wireless communication standard, an IEEE 802.11 wireless communication standard, an IEEE 802.20 wireless communication standard, Wideband Code Division Multiple Access (WCDMA) wireless communication standard, a 3GPP LTE wireless communication standard.

As shown in FIG. 9, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 11:
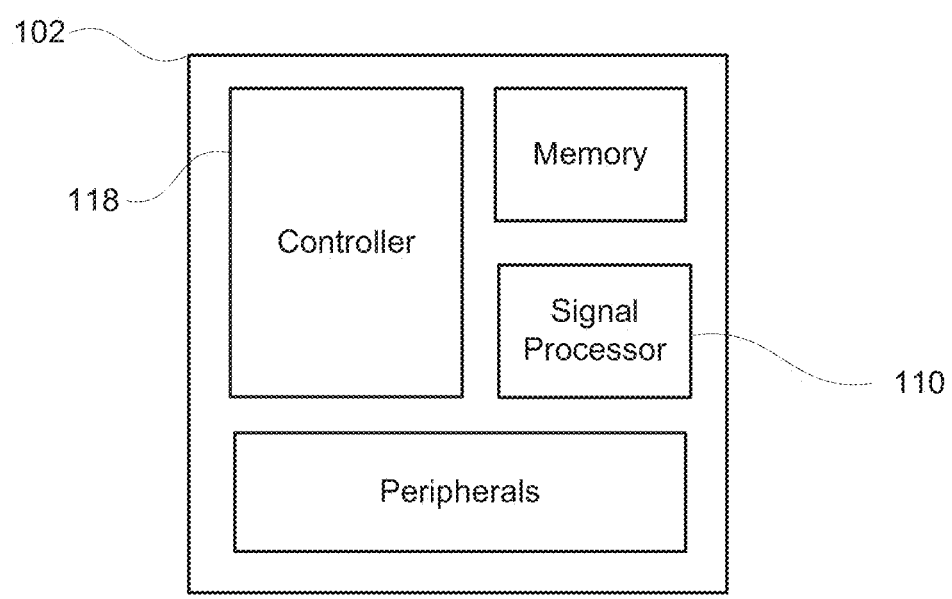
FIG. 11 illustrates a baseband subsystem for a wireless mobile station, which may be employed with aspects of the disclosure described herein.
Figure 12:
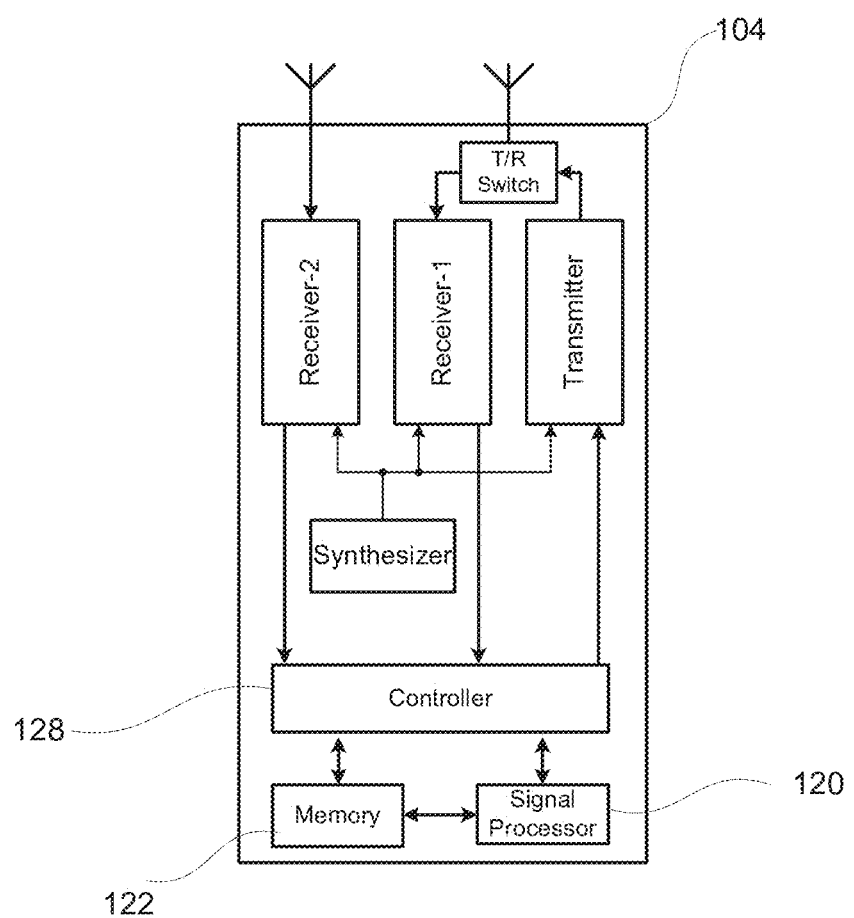
FIG. 12 illustrates a Radio Frequency (RF) subsystem for a wireless mobile station, which may be employed with aspects of the disclosure described herein.

The application processor subsystem 101 as shown in FIG. 10 may include a controller 108 such as a microcontroller, another processor or other circuitry. The baseband subsystem 102 as shown in FIG. 11 may include a controller 118 such as a microcontroller or other processor. The RF subsystem 104 as shown in FIG. 12 may include a controller 128 such as a microcontroller, another processor or other circuitry. The controller 108 desirably handles overall operation of the MS 100. This may be done by any combination of hardware, software and firmware running on the controller 108. Such combination of hardware, software and firmware may embody any methods in accordance with the aspects of the present disclosure.

In FIG. 10 the peripherals 114 such as a full or partial keyboard, video or still image display, audio interface, etc., may be employed and managed through the controller 108.

Aspects of the present disclosure may be implemented in firmware of the controller 108 of the application processor in FIG. 10 and/or the controller 118 of the baseband subsystem as shown in FIG. 11. In another alternative, aspects of the present disclosure may also be implemented as a combination of firmware and hardware of the application processor subsystem 101 and/or the baseband subsystem 102. For instance, signal processing functionality of any or all of the FIG. 11 may be implemented in firmware and/or software, which is executed by the system hardware. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use aspects of the disclosure may include smartphones, tablets, laptops, gaming consoles, cameras, video camcorders, TV, car entertainment systems, etc.

Although aspects of the disclosure herein have been described with reference to particular embodiments, it is to be understood that these embodiments are merely illustrative of the principles and applications of the aspects of the present disclosure. It is therefore to be understood that numerous modifications may be made to the illustrative embodiments and that other arrangements may be devised without departing from the spirit and scope of the aspects of the present disclosure as defined by the appended claims. Aspects of each embodiment may be employed in the other embodiments described herein.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims. Aspects of each embodiment may be employed in the other embodiments described herein.

The invention claimed is:

1. A method for decoding coded bits of a signal received at a communication device in a communication system,
wherein the coded bits are generated based on encoding a block of input bits into a plurality of streams of bits, interleaving the plurality of streams of bits into interleaved first bits and interleaved and interlaced second bits, storing the interleaved first bits and the interleaved and interlaced second bits in an encoder buffer, and outputting the interleaved first bits and the interleaved and interlaced second bits from the encoder buffer as the coded bits by removing at least one bit forming each stream of the plurality of streams of bits according to a predetermined code rate matching process;
the method comprising: controlling, by a processing device, decoding the coded bits, wherein the decoding includes:
storing the coded bits in a plurality of sets of interleaved bits in a receive buffer;
deinterleaving the interleaved bits in the receive buffer, based on resource allocation control information describing generation of the coded bits,
wherein the deinterleaving includes:
generating a first bitmap indicating positions corresponding to bits of a first stream of bits of the plurality of streams of bits in a first portion of the receive buffer, a second bit map indicating positions of bits of each of second and third streams of bits of the plurality of streams of bits in second and third portions of the receive buffer, and index information of a first unfilled row in the encoder buffer, based on the control information, wherein the control information indicates whether a given bit position in the first, second third portions of the receive buffer as an input Log Likelihood Ratio (LLR) buffer corresponds to a valid bit or a removed bit,
in which each of the first and second bitmaps indicates, for a given bit position within the bitmap, whether a corresponding column in the encoder buffer is completely or partially filled, and
determining, using at least one of the first bitmap, the second bitmap or the index information of the first unfilled row in the encoder buffer, for each bit position corresponding to a given bit in the input LLR buffer, whether a LLR corresponding to the bit position is valid or the bit position corresponds to a removed bit;
when the LLR corresponding to the bit position is determined to be valid, supplying the LLR for the given bit corresponding to the bit position as a given deinterleaved bit;
when the bit position corresponds to a removed bit, supplying a value of zero which is automatically generated as the given deinterleaved bit for the given bit corresponding to the bit position; and performing error correction on the given deinterleaved bits.

2. The method of claim 1, further comprising:
controlling, by the processing device,
initializing an initial value of a counter to zero and a maximum value of the counter to a size of the block of input bits, based on the control information, and
for each counter value from zero to the maximum value, storing in a decoding buffer the LRR for the given bit or the value of zero using the counter value as a write address for the decoding buffer, wherein the LRR for the given bit is read from the receive buffer using the counter value as a read address when the LLR corresponding to the bit position for the given bit is determined to be valid,
wherein the counter value is incremented after each storing in the decoding buffer for a given counter value.

3. The method of claim 2, further comprising:
controlling, by the processing device, a multiplexer to route, to the decoding buffer for the bit position corresponding to the given bit, the LLR for the given bit from the input LLR buffer or the value of zero.

4. The method of claim 1, wherein the control information includes at least one of Modulation and Coding Scheme (MCS), Redundancy Version or code rate associated with the generating of the coded bits.

5. The method of claim 1, wherein the communication system is a wireless communication system.

6. The method of claim 1, wherein the determining whether the LLR corresponding to the bit position is valid or the bit position corresponds to a removed bit is based on at least one of the first bitmap or the second bitmap.

7. The method of claim 6, further comprising:
controlling, by the processing device, storing the given deinterleaved bits at respective bit positions in a decoding buffer determined using the at least one of the first bitmap or the second bitmap.

8. A method for decoding coded bits of a signal received at a communication device in a communication system,
wherein the coded bits are generated based on encoding a block of input bits into first, second and third streams of bits, in which the first stream of bits includes systematic bits and the second and third streams of bits include respective second and third parity bits, interleaving the first stream of bits into interleaved first bits and the second and third streams of bits into interleaved and interlaced second bits, storing the interleaved first bits and the interleaved and interlaced second bits in an encoder buffer, and outputting the interleaved first bits and the interleaved and interlaced second bits from the encoder buffer as the coded bits by removing at least one bit forming each stream of the first, second and third streams of bits according to a predetermined code rate matching process;
the method comprising: controlling, by a processing device, decoding the coded bits, wherein the decoding includes:
storing the interleaved first bits of the coded bits in a first receive buffer, and the interleaved and interlaced second bits in second and third receive buffers, wherein the first, second and third receive buffers form an input Log Likelihood Ratio (LLR) buffer;
generating a first bitmap indicating positions corresponding to bits of the first stream of bits in the first receive buffer, a second bit map indicating positions of bits of each of the second and third streams of bits in the second and third receive buffers, and index information of a first unfilled row in the encoder buffer, based on resource allocation control information describing generation of the coded bits, wherein the control information indicates whether a given bit position in the input LLR buffer corresponds to a valid bit or a removed bit, in which each of the first and second bitmaps indicates, for a given bit position within the bitmap, whether a corresponding column in the encoder buffer is completely or partially filled;

determining, using at least one of the first bitmap, the second bitmap or the index information of the first unfilled row in the encoder buffer, for each bit position corresponding to a given bit in the input LLR buffer, whether a LLR corresponding to the bit position is valid or the bit position corresponds to a removed bit, when the LLR corresponding to the bit position is determined to be valid, storing the LLR for the given bit as a given deinterleaved bit at a corresponding bit position in a decoding buffer;

when the bit position corresponds to a removed bit, storing a value of zero which is automatically generated as the given deinterleaved bit at the corresponding bit position in the decoding buffer; and performing error correction on the given deinterleaved bits in the decoding buffer.

9. The method of claim 8, wherein each of the first and second bit maps uses a same predetermined number of bits and a number of columns in the encoder buffer is equal to three times the predetermined number of bits.

10. An apparatus for decoding coded bits of a signal received at a communication device in a communication system, wherein the coded bits are generated based on encoding a block of input bits into a plurality of streams of bits, interleaving the plurality of streams of bits into interleaved first bits and interleaved and interlaced second bits, storing the interleaved first bits and the interleaved and interlaced second bits in an encoder buffer, and outputting the interleaved first bits and the interleaved and interlaced second bits from the encoder buffer as the coded bits by removing at least one bit forming each stream of the plurality of streams of bits according to a predetermined code rate matching process;

the apparatus comprising:
circuitry configured to control decoding the coded bits, wherein the decoding includes:

storing the coded bits in a plurality of sets of interleaved bits in a receive buffer;

deinterleaving the interleaved bits in the receive buffer, based on resource allocation control information describing generation of the coded bits, wherein the deinterleaving includes:

generating a first bitmap indicating positions corresponding to bits of a first stream of bits of the plurality of streams of bits in a first portion of the receive buffer, a second bit map indicating positions of bits of each of second and third streams of bits of the plurality of streams of bits in second and third portions of the receive buffer, and index information of a first unfilled row in the encoder buffer, based on the control information, wherein the control information indicates whether a given bit position in the first, second third portions of the receive buffer as an input Log Likelihood Ratio (LLR) buffer corresponds to a valid bit or a removed bit, in which each of the first and second bitmaps indicates, for a given bit position within the bitmap, whether a corresponding column in the encoder buffer is completely or partially filled, and determining, using at least one of the first bitmap, the second bitmap or the index information of the first unfilled row in the encoder buffer, for each bit position corresponding to a given bit in the input LLR buffer, whether a LLR corresponding to the bit position is valid or the bit position corresponds to a removed bit;

when the LLR corresponding to the bit position is determined to be valid, supplying the LLR for the given bit corresponding to the bit position as a given deinterleaved bit;

when the bit position corresponds to a removed bit, supplying a value of zero which is automatically generated as the given deinterleaved bit for the given bit corresponding to the bit position; and performing error correction on the given deinterleaved bits.

11. The apparatus of claim 10,
wherein the circuitry is configured to control:
initializing an initial value of a counter to zero and a maximum value of the counter to a size of the block of input bits, based on the control information, and for each counter value from zero to the maximum value, storing in a decoding buffer the LRR for the given bit or the value of zero using the counter value as a write address for the decoding buffer, wherein the LRR for the given bit is read from the receive buffer using the counter value as a read address when the LLR corresponding to the bit position for the given bit is determined to be valid, wherein the counter value is incremented after each storing in the decoding buffer for a given counter value.

12. The apparatus of claim 11, wherein the circuitry is configured to control a multiplexer to route, to the decoding buffer for the bit position corresponding to the given bit, the LLR for the given bit from the input LLR buffer or the value of zero.

13. The apparatus of claim 10, wherein the control information includes at least one of Modulation and Coding Scheme (MCS), Redundancy Version or code rate associated with the generating of the coded bits.

14. The apparatus of claim 10, wherein the communication system is a wireless communication system.

15. The apparatus of claim 10, wherein the determining whether the LLR corresponding to the bit position is valid or the bit position corresponds to a removed bit is based on at least one of the first bitmap or the second bitmap.

16. The apparatus of claim 15, wherein circuitry is configured to control storing the given deinterleaved bits at respective bit positions in a decoding buffer determined using the at least one of the first bitmap or the second bitmap.

17. A wireless communication device comprising:
a receiver to receive a signal of a wireless communication system; and
a processing device configured to control decoding coded bits of the signal,
wherein the coded bits are generated based on encoding a block of input bits into a plurality of streams of bits, interleaving the plurality of streams of bits into interleaved first bits and interleaved and interlaced second bits, storing the interleaved first bits and the interleaved and interlaced second bits in an encoder buffer, and outputting the interleaved first bits and the interleaved and interlaced second bits from the encoder buffer as the coded bits by removing at least one bit forming each stream of the plurality of streams of bits according to a predetermined code rate matching process, wherein the processing device is configured to control decoding the coded bits, wherein the decoding includes:

storing the coded bits in a plurality of sets of interleaved bits in a receive buffer;

deinterleaving the interleaved bits in the receive buffer, based on resource allocation control information describing generation of the coded bits, wherein the deinterleaving includes:

generating a first bitmap indicating positions corresponding to bits of a first stream of bits of the plurality of streams of bits in a first portion of the receive buffer, a second bit map indicating positions of bits of each of second and third streams of bits of the plurality of streams of bits in second and third portions of the receive buffer, and index information of a first unfilled row in the encoder buffer, based on the control information, wherein the control information indicates whether a given bit position in the first, second third portions of the receive buffer as an input Log Likelihood Ratio (LLR) buffer corresponds to a valid bit or a removed bit, in which each of the first and second bitmaps indicates, for a given bit position within the bitmap, whether a corresponding column in the encoder buffer is completely or partially filled, and determining, using at least one of the first bitmap, the second bitmap or the index information of the first unfilled row in the encoder buffer, for each bit position corresponding to a given bit in the input LLR buffer, whether a LLR corresponding to the bit position is valid or the bit position corresponds to a removed bit;

when the LLR corresponding to the bit position is determined to be valid, supplying the LLR for the given bit corresponding to the bit position as a given deinterleaved bit;

when the bit position corresponds to a removed bit, supplying a value of zero which is automatically generated as the given deinterleaved bit for the given bit corresponding to the bit position; and performing error correction on the given deinterleaved bits.

18. The wireless communication device of claim 17, wherein the processing device is configured to control:

initializing an initial value of a counter to zero and a maximum value of the counter to a size of the block of input bits, based on the control information, and for each counter value from zero to the maximum value, storing in a decoding buffer the LRR for the given bit or the value of zero using the counter value as a write address for the decoding buffer, wherein the LRR for the given bit is read from the receive buffer using the counter value as a read address when the LLR corresponding to the bit position for the given bit is determined to be valid, wherein the counter value is incremented after each storing in the decoding buffer for a given counter value.

19. The wireless communication device of claim 18, wherein the processing device is configured to control a multiplexer to route, to the decoding buffer for the bit position corresponding to the given bit, the LLR for the given bit from the input LLR buffer or the value of zero.

20. The wireless communication device of claim 17, wherein the determining whether the LLR corresponding to the bit position is valid or the bit position corresponds to a removed bit is based on at least one of the first bitmap or the second bitmap.

\* \* \* \* \*